(12) United States Patent
Tadokoro et al.

(10) Patent No.: US 11,067,093 B2
(45) Date of Patent: Jul. 20, 2021

(54) PROPELLER FAN, AIR-SENDING DEVICE, AND AIR-CONDITIONING APPARATUS

(71) Applicant: Mitsubishi Electric Corporation, Chiyoda-ku (JP)

(72) Inventors: Takahide Tadokoro, Chiyoda-ku (JP); Naohiko Honma, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 78 days.

(21) Appl. No.: 16/475,537

(22) PCT Filed: Feb. 28, 2017

(86) PCT No.: PCT/JP2017/007993
§ 371 (c)(1),
(2) Date: Jul. 2, 2019

(87) PCT Pub. No.: WO2019/158859
PCT Pub. Date: Sep. 7, 2018

(65) Prior Publication Data
US 2020/0240429 A1 Jul. 30, 2020

(51) Int. Cl.
*F04D 29/38* (2006.01)
(52) U.S. Cl.
CPC ...... *F04D 29/384* (2013.01); *F05D 2240/301* (2013.01); *F05D 2240/303* (2013.01); *F05D 2240/304* (2013.01)
(58) Field of Classification Search
CPC ............ F04D 29/384; F05D 2240/301; F05D 2240/303; F05D 2240/304; Y02T 50/60
See application file for complete search history.

(56) References Cited

U.S. PATENT DOCUMENTS

2010/0266428 A1   10/2010   Nakagawa et al.

FOREIGN PATENT DOCUMENTS

EP   3 085 966 A1   10/2016
JP   2008-25422 A   2/2008
(Continued)

OTHER PUBLICATIONS

Chinese Office Action dated Apr. 29, 2020 issued in corresponding CN patent application No. 201780086543.1 (and English translation).

(Continued)

*Primary Examiner* — Jacob M Amick
*Assistant Examiner* — Charles J Brauch
(74) *Attorney, Agent, or Firm* — Xsensus LLP

(57) ABSTRACT

In a propeller fan, an air-sending device and an air-conditioning apparatus, between a leading edge and trailing edge of each of blades, a starting point at which the first one of first maximum points is located is closer to the leading edge than a starting point at which the first one of second maximum points are located, distances L1 between minimum points and the first maximum points vary such that the distance L1 increases from the starting point at which the first one of the first maximum points is located, toward the trailing edge, and distances L2 between a connection point and the second maximum points vary in accordance with the position of each of the second maximum points such that the distance L2 increases from the starting point at which the first one of the second maximum points is located, toward the trailing edge.

11 Claims, 13 Drawing Sheets

(56) References Cited

FOREIGN PATENT DOCUMENTS

| | | | |
|---|---|---|---|
| JP | 2008025422 A | * | 2/2008 |
| JP | 2009-185803 A | | 3/2009 |
| JP | 2013-249737 A | | 12/2013 |
| WO | WO 2015/092924 A1 | | 6/2015 |
| WO | WO-2015092924 A1 | * | 6/2015 ........... F04D 29/384 |

OTHER PUBLICATIONS

International Search Report dated May 30, 2017 in PCT/JP2017/007993 filed Feb. 28, 2017.

* cited by examiner

PROPELLER FAN, AIR-SENDING DEVICE, AND AIR-CONDITIONING APPARATUS

TECHNICAL FIELD

The present invention relates to a propeller fan, an air-sending device including the propeller fan and an air-conditioning apparatus using the air-sending device.

BACKGROUND ART

Various propeller fans provided to achieve low noise and a high efficiency have been proposed. For example, as devices for reducing noise during an air-sending operation, the following propeller fans have been proposed: a propeller fan in which a folded portion is provided at an outer peripheral edge of each of blades to weaken a vortex generated at a tip; and a propeller fan in which a cutout or a corrugated wavy surface is provided at a trailing edge of each of blades to disturb an air flow, thereby avoiding specific frequency sound (see Patent Literature 1). Also, in a proposed propeller fan, irregularities are provided at a trailing edge of each blade to prevent air from flowing on an outer side of the blade only, thereby improving efficiency. (Patent Literature 2).

CITATION LIST

Patent Literature

Patent Literature 1: Japanese Unexamined Patent Application Publication No. 2013-249787
Patent Literature 2: Japanese Unexamined Patent Application Publication No. 2009-185803

SUMMARY OF INVENTION

Technical Problem

To operate a propeller fan at a high efficiency with low noise, it is necessary to reduce disturbance of an air flow. In order to do so, air needs to flow along a blade.

However, since the difference between the rotation speeds of the outer side and inner side of a blade is large, or air is given a radially outward force by a centrifugal force, the air hardly flows along the blade at the inner side of the blade, and separated vortexes are generated at a position located away from a surface of the blade, especially, on a downstream side of the air flow.

Even in the case where an uneven region is provided at an end portion of a blade as in a propeller fan described in Patent Literature 1, in the vicinity of a center portion of the blade, it is hard to control air flowing toward a radially outer side of the blade to flow along the blade, and also hard to control separated air flow to flow along the blade. Furthermore, in the case where a blade is formed to have a cross section having a wavy shape which is bilaterally symmetric in a radial direction of the blade as in a propeller fan described in Patent Literature 2, it is formed to have a region where the normal to the blade is inclined outwards in the radial direction, as a result of which a force pushing the air flow outwards is enhanced. Therefore, it is also hard to control an air flow at the inner side of the blade to flow along the blade.

The present invention has been made to solve the above problems, and an object of the invention is to provide a propeller fan, an air-sending device and an air-conditioning apparatus that achieve low noise and a high efficiency by causing an air flow to flow along a blade, thereby reducing separation of air flow or vortexes of air flow which are generated by the separation of the air flow, and thus reducing a pressure loss.

Solution to Problem

A propeller fan according to an embodiment of the present invention includes a boss connected to a rotary shaft of a driving device, and a plurality of blades provided at an outer periphery of the boss, and configured to send air in a direction along a rotation axis. In a cross section of each of the plurality of blades in a radial direction thereof, each blade includes: an outer-side curved portion formed close to an outer peripheral portion of the blade and curved in such a way as to project toward a downstream side of an air flow; an inner-side curved portion formed between the outer-side curved portion and the boss and curved in such a way as to project toward the downstream side of the air flow; first maximum points at each of which a plane perpendicular to the rotation axis is tangent to part of a positive-pressure surface of the blade, which corresponds to a positive-pressure surface of the outer-side curved portion; second maximum points at each of which a plane perpendicular to the rotation axis is tangent to part of the positive-pressure surface of the blade, which corresponds to a positive-pressure surface of the inner-side curved portion; minimum points at each of which a plane perpendicular to the rotation axis is tangent to part of the positive-pressure surface of the blade, which corresponds to a positive-pressure surface of a valley-shaped portion curved in such a way as to be recessed between the first maximum point and the second maximum point; and a connection point at which the boss contacts with the positive-pressure surface of the blade. Between a leading edge and a trailing edge of the blade in a rotation direction of the blade, a starting point at which a first one of the first maximum points is located is closer to the leading edge than a starting point at which a first one of the second maximum points is located. Distances L1 between the minimum points and the first maximum points in the direction along the rotation axis vary such that the distance L1 between the minimum point and the first maximum point in the direction along the rotation axis increases from the starting point at which the first one the first maximum points is located, toward the trailing edge. Distances L2 between the connection point and the second maximum points in the direction along the rotation axis vary such that the distance L2 between the connection point and the second maximum point in the direction along the rotation axis increases from the starting point at which the first one of the second maximum points is located, toward the trailing edge.

Advantageous Effects of Invention

In the propeller fan, the air-sending device and the air-conditioning apparatus according to the embodiment of the present invention, each of blades of the propeller fan includes, in the radial cross section of each blade, the curved portions where the normal to the positive-pressure surface of the blade is inclined inwards, thereby preventing an air flow from flowing only on the radially outer side. In addition, the blade is provided with two curved portions, whereby an air flow is divided and regulated. It is therefore possible to reduce separation of the air flow from the blade, and as a result, a pressure loss which is caused by separation of air flow or vortexes of air. Therefore, the propeller fan, the air-sending device and the air-conditioning apparatus achieve high efficiency and low noise.

DESCRIPTION OF EMBODIMENTS

The embodiments of the present invention will be described with reference to the drawings. In the figures including FIG. 1, which are to be referred, the relationship in size between components may be different from the actual one. Also, in each of the figures including FIG. 1, components which are the same as or similar to those in a previous one of the figures are denoted by the same reference signs. The same is true of the entire text of the specification. The configurations of elements described in the entire text of the specification are mere examples of the actual configurations, and do not limit to those described in the text.

Embodiment 1

Figure 1:
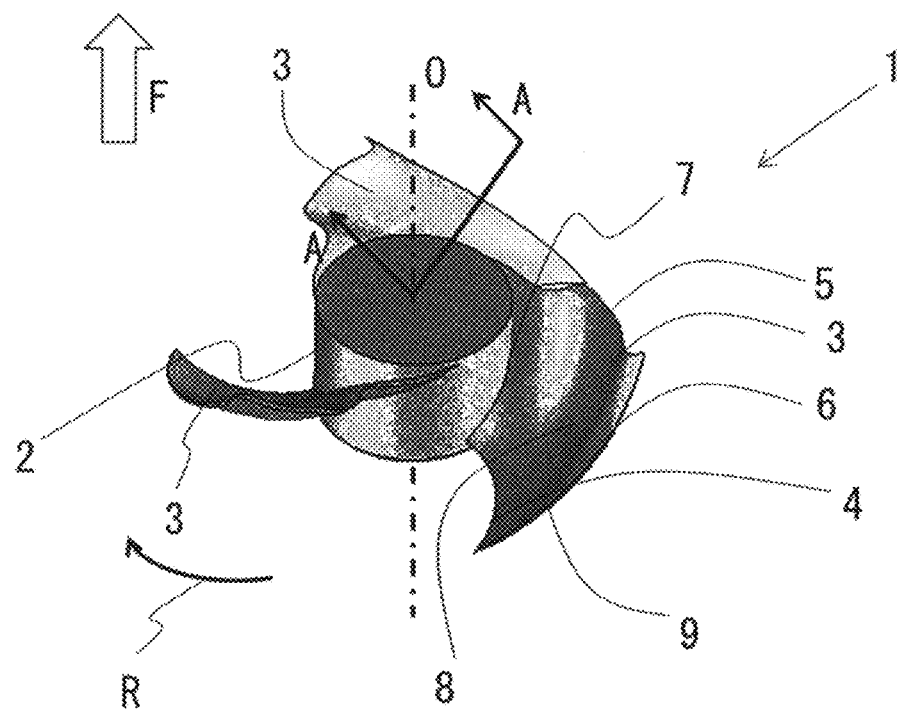
FIG. 1 is a perspective view illustrating a propeller fan according to embodiment 1 of the present invention as viewed from a downstream side of air flow.

FIG. 1 is a perspective view illustrating a propeller fan according to embodiment 1 of the present invention as viewed from a downstream side of an air flow. A propeller fan 1 will be described with reference to FIG. 1. In FIG. 1, a rotation direction about a rotation axis O of the propeller fan 1 is denoted by R, and the direction of an air flow generated by rotation of the propeller fan 1 is denoted by F as an air flow direction.

As illustrated in FIG. 1, the propeller fan 1 includes a cylindrical boss 2 and a plurality of blades 3. The boss 2 is provided at the center of the propeller fan 1, and connected to a rotary shaft of a driving device. The blades 3 are provided at an outer periphery of the boss 2, and sends air in a direction along the rotation axis O. The boss 2 is connected to the rotary shaft of the driving device, which is, for example, a motor (not illustrated). FIG. 1 illustrates by way of example the case where three blades 3 are connected to the boss 2. The number of blades 3 may be two or may be four or more. Referring to FIG. 1, the boss 2 has a cylindrical shape; however, the boss 2 may have another shape which is any of general shapes of bosses, such as a polygonal column, a conical shape, a pyramid shape, a hemispherical shape, and a spherical shape.

Each of the blades 3 includes a leading edge 4 and a trailing edge 5. The leading edge 4 is located on a front side in the rotation direction R. The trailing edge 5 is located on a rear side in the rotation direction R, and opposite to the leading edge 4. Each blade 3 further has an outer peripheral portion 6 and an inner peripheral portion 7. The outer peripheral portion 6 forms an outer edge portion of the blade 3, which connect the leading edge 4 and the trailing edge 5. The inner peripheral portion 7 is connected to the boss 2 as an inner edge portion of the blade 3, which connects the leading edge 4 and the trailing edge 5. In each blade 3, in the air flow direction F, a blade surface on a downstream side will be referred to as a positive-pressure surface 8, and a blade surface on an upstream side will be referred to as a negative-pressure surface 9.

Figure 2:
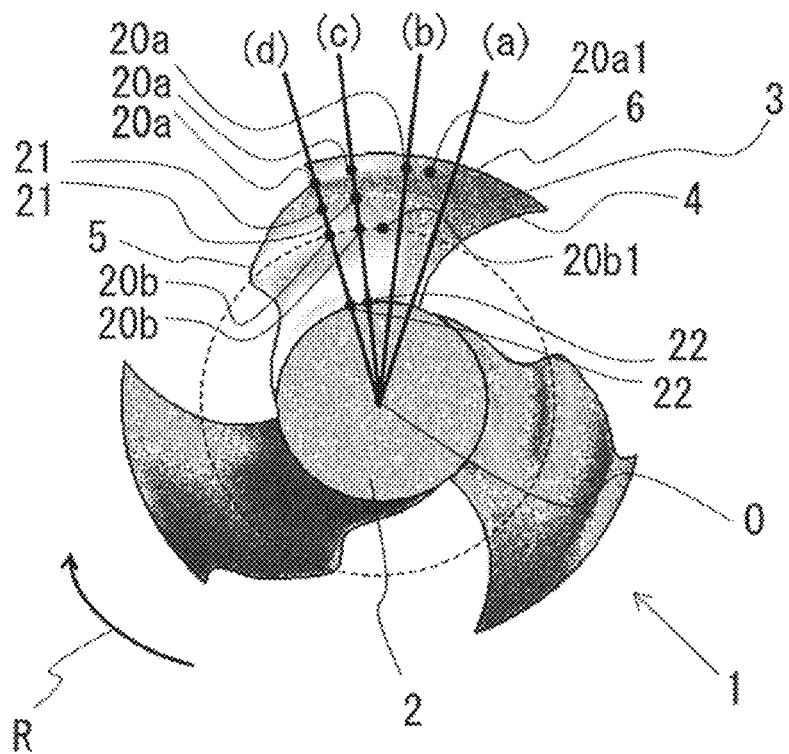
FIG. 2 is a top view of the propeller fan according to embodiment 1 of the present invention as viewed from the downstream side of air flow.
Figure 3:
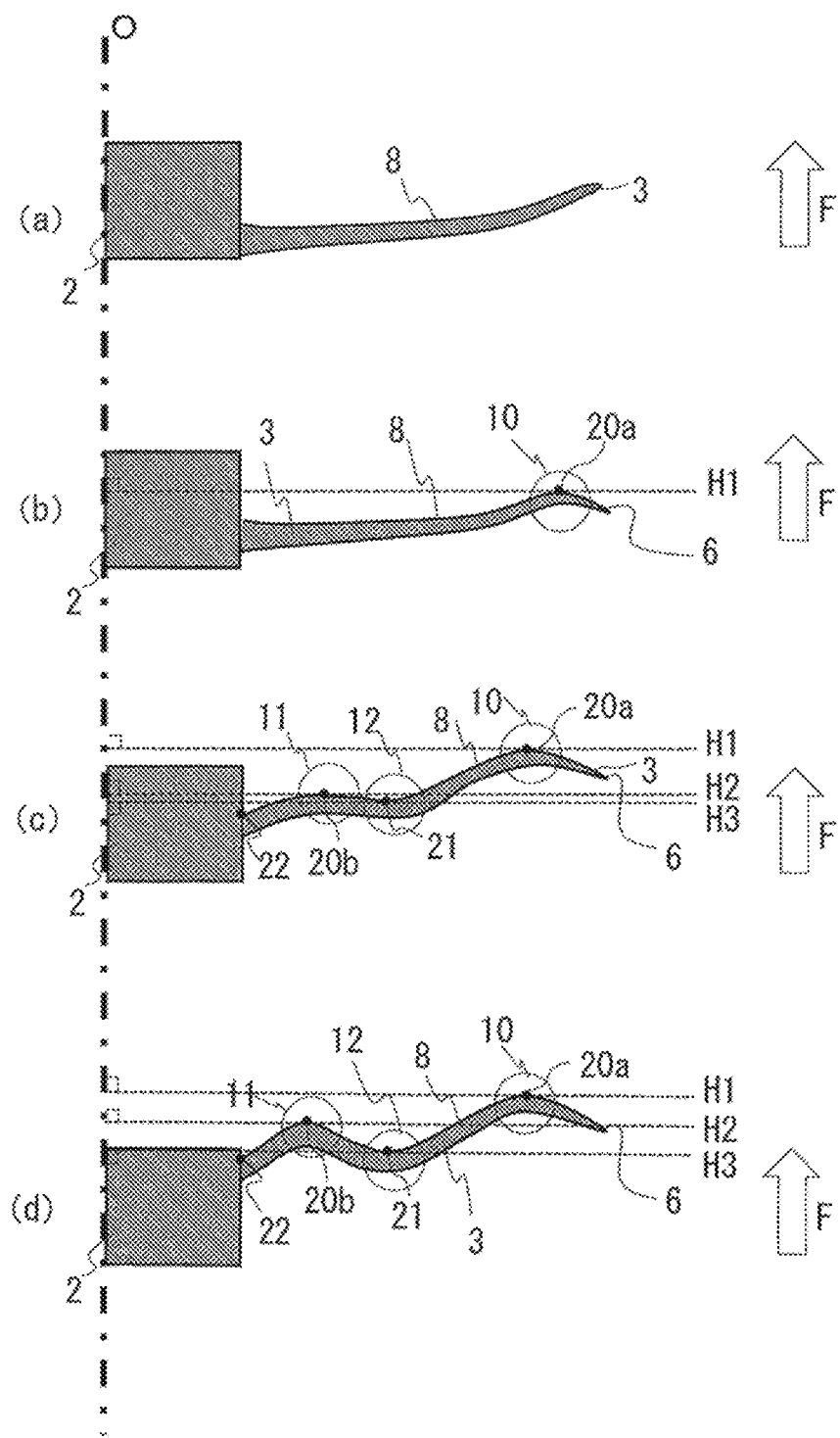
FIG. 3 illustrates radial cross-sectional views of the propeller fan as illustrated in FIG. 2.

FIG. 2 is a top view of the propeller fan according to embodiment 1 of the present invention as viewed from the air flow downstream side. FIG. 3 illustrates radial cross-sectional views of the propeller fan of FIG. 2. Cross-sectional views (a), (b), (c) and (d) in FIG. 3 illustrate radial cross sections (a), (b), (c) and (d) of the propeller fan 1, which are taken in a radial direction of the propeller fan 1 at four locations (a), (b), (c) and (d), respectively, between the leading edge 4 and trailing edge 5 of the blade 3 in FIG. 2. The cross section of each blade 3 of the propeller fan 1 according to embodiment 1 of the present invention will be described with reference to FIGS. 2 and 3.

In the cross section (a), the blade 3 is roughly curved toward the upstream side.

In the cross sections (b) to (d), the blade 3 is shaped to have an outer-side curved portion 10 which is formed close to the outer peripheral portion 6 of the blade 3, and which is projected toward the air flow downstream side; and the blade 3 further has first maximum points 20a at each of which a plane H1 perpendicular to the rotation axis O is tangent to the positive-pressure surface 8 of the blade 3 in the outer-side curved portion 10. In the cross sections (c) and (d), the blade 3 has an inner-side curved portion 11 which is formed between the outer-side curved portion 10 and the boss 2, and is projected toward the downstream side of the air flow; the blade 3 has second maximum points at each of which a plane H2 perpendicular to the rotation axis O is tangent to the positive-pressure surface 8 of the blade 3 in the inner-side curved portion 11; and the blade 3 has minimum points 21 at each of which a plane H3 perpendicular to the rotation axis O is tangent to the positive-pressure surface 8 of the blade 3 at a valley-shaped portion 12 which is curved in such a way to be recessed between the first maximum point 20a and the second maximum point 20b. Points at which the positive-pressure surface 8 of the blade 3 contacts with the boss 2 will be referred to as connection points 22.

As illustrated in FIG. 2, in each of the radial cross sections between the leading edge 4 and the trailing edge 5, a starting point 20a1 and a starting points 20b1 are located, and first maximum points 20a and second maximum points 20b are continuously located from the starting point 20a1 and the starting point 20b1 to the trailing edge 5. In the propeller fan 1, between the leading edge 4 and the trailing edge 5 in the rotation direction R of the blade 3, the starting point 20a1 from which the first maximum points 20a are continuously located is closer to the leading edge 4 than the starting point 20b1 from which the second maximum points 20b are continuously located. It should be noted that each of the starting points is a position at which the first one of the first maximum points 20a or the second maximum points 20b is located in the blade 3 in the range from the leading edge 4 toward the trailing edge 5 in the rotation direction R of the blade 3.

Figure 4:
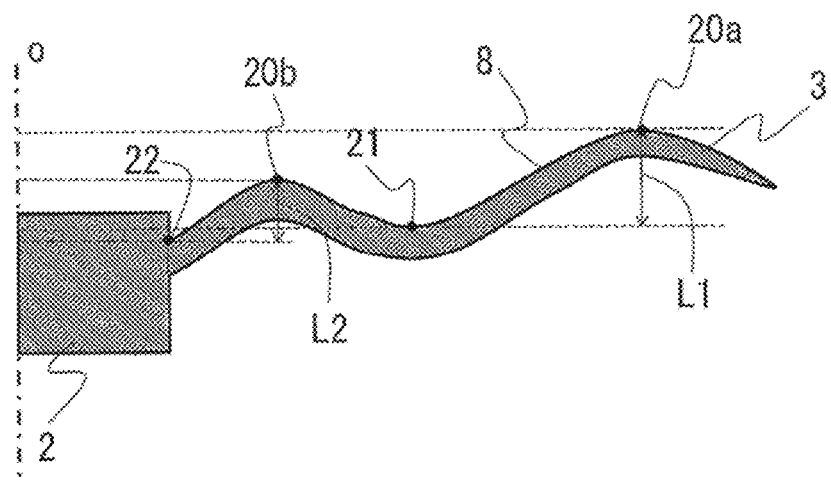
FIG. 4 is a cross-sectional view of the propeller fan according to embodiment 1 of the present invention, which is taken from a rotation axis to an outer peripheral portion.

FIG. 4 is a cross-sectional view of the propeller fan according to embodiment 1 of the present invention, which is taken from the rotation axis to the outer peripheral portion. FIG. 4 illustrates a radial cross section of part of the propeller fan 1, at which a first maximum point 20a, a minimum point 21, a second maximum point 20b and a connection point 22 are located in the blade 3. As illustrated in FIG. 4, the distance between the first maximum point 20a and the minimum point 21 in a direction along the rotation axis O is distance L1, and the distance between the second maximum point 20b and the connection point 22 in the direction along the rotation axis O is distance L2. The distance L1 between the minimum point 21 and the first maximum point 20a in the direction along the rotation axis O increases from the starting point 20a1 from which the first maximum points 20a are continuously located, toward the trailing edge 5. The distance L2 between the connection point 22 and the second maximum point 20b in the direction along the rotation axis O increases from the starting point 20b1 from which the second maximum points 20b are continuously located, toward the trailing edge 5.

Figure 5:
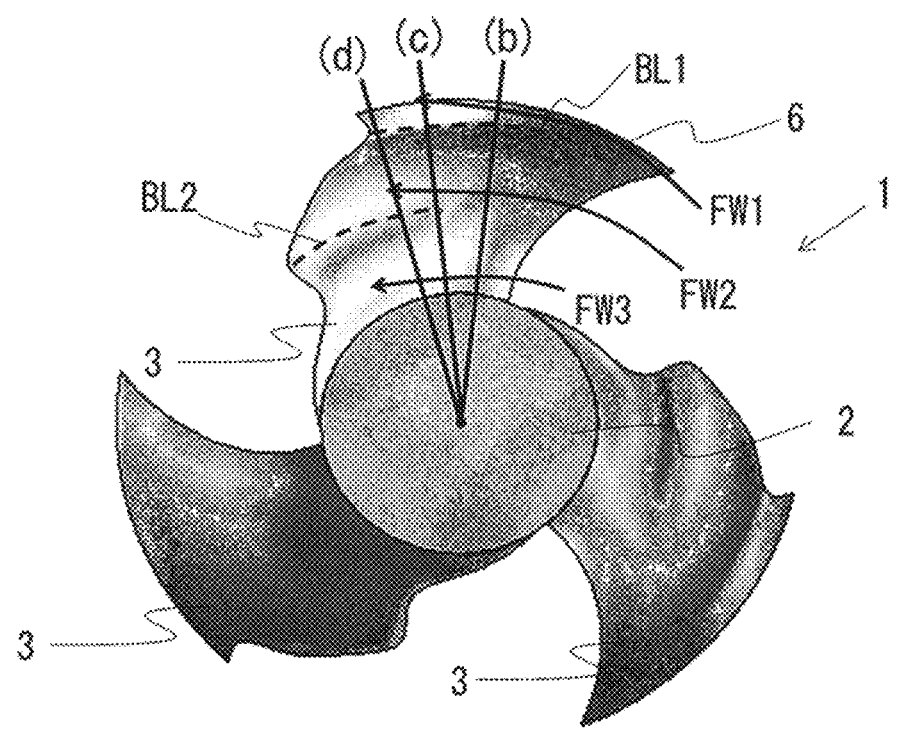
FIG. 5 is a top view of the propeller fan according to embodiment 1 of the present invention, which is used in explanation of an operation of the propeller fan.

FIG. 5 is a top view of the propeller fan, which is used in explanation of an operation of the propeller fan according to embodiment 1 of the present invention. The operation of the propeller fan according to embodiment 1 of the present invention will be described with reference to schematic illustration of air flow in the figure. With respect to the air flow passing over the blade 3 of the propeller fan 1, FIG. 5 illustrates air flow FW1 to air flow FW3 which pass over respective positions which are different in the radial direction. In FIG. 5, dashed line BL1 indicates an imaginary line connecting the first maximum points 20a of radial cross sections, and dashed line BL2 indicates an imaginary line connecting second maximum points 20b of radial cross sections. The propeller fan 1 has a shape such that the trailing edge of each blade is wavy between an inner side and an outer side thereof in the rotation direction and in the counter-rotation direction, as viewed from the downstream side of the air flow. As the propeller fan 1 is rotated by a device which drives the propeller fan 1, such as a fan motor, the blade 3 pushes out the air flow toward the downstream side, and air flows onto the blade 3 from the upstream side. The outer peripheral portion 6 of the blade 3 is adjacent to the space between the blade 3 and a bell mouth (not illustrated), as a result of which the air flow FW1 along the blade 3 is made by a centrifugal force to easily leak from the blade 3, that is, flow away from the blade 3 to the outside thereof. Generally, when the air flow FW1 flows away from the blade to the outside thereof, that is, leakage of the air flow FW1 from the blade occurs, vortexes of air flowing around from a top surface (positive-pressure surface) of the blade to a back surface (negative-pressure surface) are generated, and cause disturbance of the air flow. The greater the differential pressure between the positive-pressure surface and the negative-pressure surface, the stronger the vortexes of the air.

Figure 6:
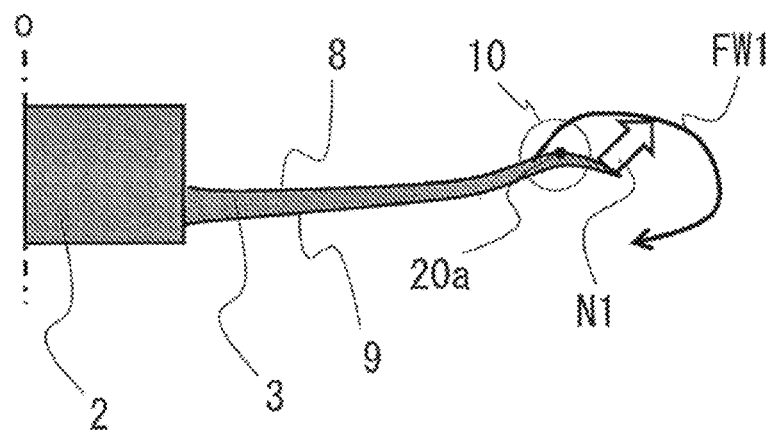
FIG. 6 is a cross-sectional view according to embodiment 1 of the present invention, which is used in explanation of another operation of the propeller fan and air flow at the outer peripheral portion.

FIG. 6 is a cross-sectional view for explaining an operation of the propeller fan according to embodiment 1 of the present invention and an air flow at the outer peripheral portion. FIG. 6 is a cross-sectional view corresponding to the cross section (b) in FIG. 5, and illustrates the air flow FW1 passing over the outer side of the blade 3, in the cross-sectional view. In the propeller fan 1, since the outer-side curved portion 10 having the first maximum points 20a as vertexes is provided at the outer portion of the blade 3, the blade 3 is formed such that the normal N1 to the positive-pressure surface 8 is inclined outwards in the radial direction. That is, in the propeller fan 1, the normal N1 to the positive-pressure surface 8 is inclined outwards in the radial direction because of provision of the outer-side curved portion 10 having the first maximum points 20a as vertexes, in order to intentionally causing the air flow FW1 to easily leak from the blade, that is, flow away from the blade to the outside thereof. Since the blade 3 is configured in such a way, the propeller fan 1 can reduce the differential pressure between the positive-pressure surface 8 and the negative-pressure surface 9 of the blade 3, and reduce disturbance of the air flow which is caused by the air flowing around the blade.

Figure 7:
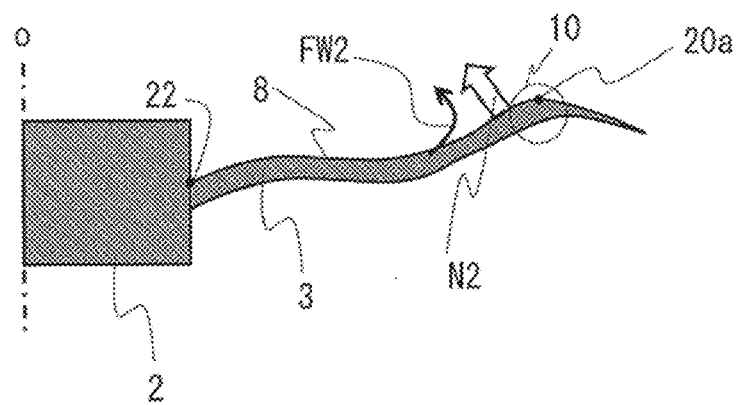
FIG. 7 is a cross-sectional view used in explanation of still another operation of the propeller fan according to embodiment 1 of the present invention and air flow passing over an area inward of a first maximum point.

FIG. 7 is a cross-sectional view for explaining an operation of the propeller fan according to embodiment 1 of the present invention and air flow passing over an area inward of a first maximum point FIG. 7 illustrates the cross-sectional view corresponding to the cross section (c) in FIG. 5, and illustrates the air flow FW2 passing over the center of the blade 3, in the cross-sectional view. The air flow FW2 passing over the area inward of the first maximum points 20a is air flow passing over an area that is inward of the outer peripheral edge of the blade 3 from which an air flow leaks, and that is located on a relatively outer side in the radial direction. In the above area, the blade applies a large toque to the air flow. In the area, it is necessary to increase a pressure rise on the positive-pressure surface 8 by reducing leakage of the air flow FW2, and increasing a load from the blade 3 onto the air flow FW2. In view of this point, in the propeller fan 1, as illustrated in FIG. 7, the outer-side curved portion 10 having the first maximum points 20a as vertexes is provided at the blade 3, whereby the normal N2 to the positive-pressure surface 8 is inclined toward the inner side. Since the normal N2 to the positive-pressure surface 8 of the blade 3 is inclined toward the inner side, the propeller fan 1 reduces leakage of the air flow FW2 toward the outer side of the blade 3 which is caused by a centrifugal force. Because of the above configuration of the blade 3, the propeller fan 1 is capable of sending an air flow whose pressure is raised by energy applied from the blade 3 to the air flow FW2, to the downstream side without waste.

Figure 8:
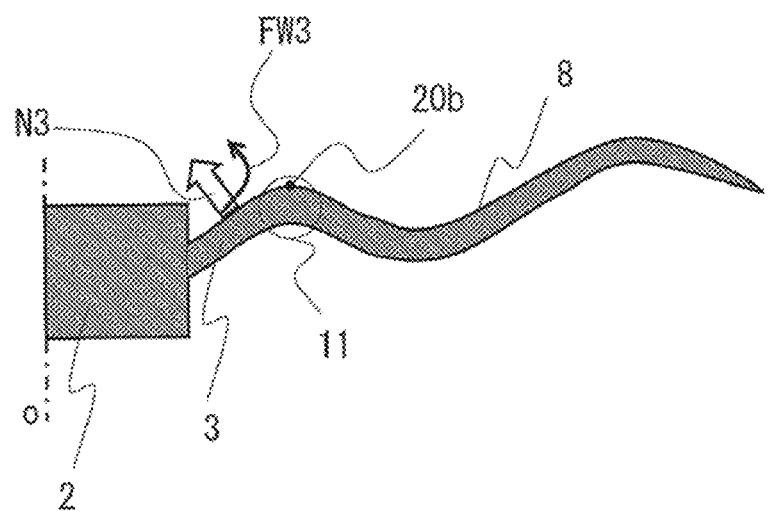
FIG. 8 is a cross-sectional view used in a further operation of the propeller fan according to embodiment 1 of the present invention and air flow passing over an area inward of a second maximum point.

FIG. 8 is a cross-sectional view for explaining an operation of the propeller fan according to embodiment 1 of the present invention and an air flow passing over an area inward of a second maximum point. FIG. 8 is a cross-sectional view corresponding to the cross section (d) in FIG. 5, and illustrates the air flow FW3 passing over the area inward of the second maximum points 20b of the blade 3, in the cross-sectional view. Generally, an air flow on the inner side of the blade in the radial direction is surrounded by the boss and the blade. Thus, a velocity gradient occurs because of the friction of the air flow with the boss, thereby generating vortexes. Therefore, an air flow close to the boss is easily disturbed. In an existing propeller fan, disturbed air flow is made by a centrifugal force to flow outwards in the radial direction, and causes disturbance of an air flow close to a radially center portion of the blade which is a center portion thereof in the radial direction. The propeller fan 1 is provided with the inner-side curved portion 11 having the second maximum points 20b at part of the blade 3 which is close to the boss 2. As illustrated in FIG. 8, in the propeller fan 1, the normal N3 to the positive-pressure surface 8 is inclined toward the inner side because of provision of the inner-side curved portion 11 having the second maximum points 20b as vertexes. Since the normal N3 to the positive-pressure surface 8 of the blade 3 is inclined toward the inner side, the propeller fan 1 is capable of preventing the disturbed air flow FW3 close to the boss 2 from flowing toward the center side of the blade 3.

The starting point of the second maximum point 20b is closer to the trailing edge 5, that is, the downstream side, than the starting point of the first maximum point 20a.

Since the blade 3 configured in such a manner, an air flow which is not greatly disturbed, for example, does not have a vortex, and flows at part of the leading edge 4 which is close to the boss 2, such as a vortex, is guided to a flow path indicated by the air flow FW2 in FIG. 5, where the pressure is raised. It is therefore possible to reduce decreasing of the rate of supply of air.

Generally, the influence of a centrifugal force increases while air flows along the blade, as a result of which air easily flows outwards in the radial direction. In the propeller fan 1, the distance L1 between the minimum point 21 and the first maximum point 20a in the direction along the rotation axis O increases from the starting point 20a1, at which the first one of the first maximum points 20a is located, toward the trailing edge 5. The distance L2 between the connection point 22 and the second maximum point 20b in the direction along the rotation axis O increases from the starting point 20b1, from which the second maximum points 20b are located, toward the trailing edge 5. In the propeller fan 1, the difference in level between the first maximum point 20a and the minimum point 21 and the difference in level between the second maximum point 20b and the connection point 22 increases toward the trailing edge 5. Thus, the propeller fan 1 is capable of regulating an air flow which flows toward the trailing edge 5 in a centrifugal direction. It is necessary to consider the point that the air flow FW1 on the outer side of the blade 3 is given a large centrifugal force and easily leaks outwards in the radial direction. Therefore, it is preferable that the distance L1 between the minimum point 21 and the first maximum point 20a in the direction along rotation axis O be greater than the distance L2 between the connection point 22 and the second maximum point 20b in the direction along the rotation axis O.

Figure 9:
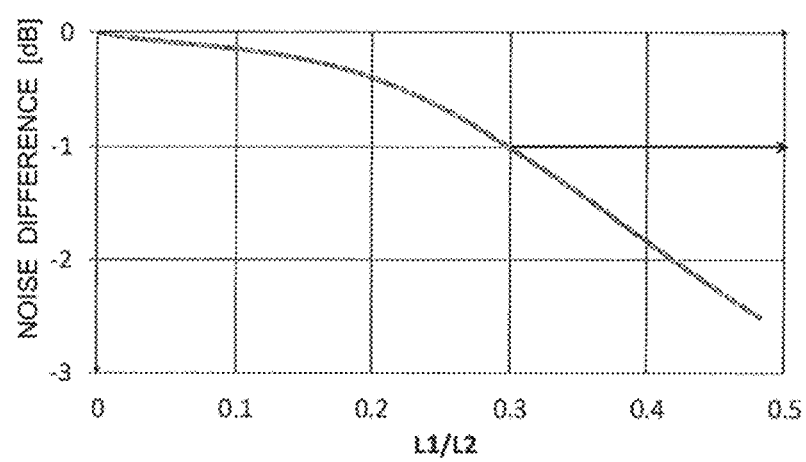
FIG. 9 is a graph illustrating the relationship between the ratio of the distance L1 to the distance L2 at the propeller fan according to embodiment 1 of the present invention and a noise difference.

FIG. 9 is a graph indicating a relationship between the ratio of the distance L1 to the distance L2 of the propeller fan according to embodiment 1 of the present invention and noise difference. The relationship between the ratio of the distance L1 to the distance L2 at the propeller fan 1 and noise made by the propeller fan 1 will be described. FIG. 9 is a graph indicating the tendency of a change of fan noise which is made in the case where the ratio of the distance L1 to the distance L2 (L1/L2) at the propeller fan 1 is changed, based on experiments. In FIG. 9, the abscissa axis represents the ratio of the distance L1 to the distance L2 (L1/L2) at the propeller fan 1, and the ordinate axis represents noise difference [dB], and indicates that the noise level decreases from the highest level toward the lowest level. The result obtained by the experiments demonstrate that as indicated in FIG. 9, noise decreases as the ratio of the distance L1 to the distance L2 (L1/L2) increases. In particular, it should be noted that in the case where the propeller fan 1 is configured such that the ratio of the distance L1 to the distance L2 (L1/L2) is greater than or equal to 0.3, noise can be remarkably reduced.

In the case where the blade is formed to have a plurality of projected portions as in the related art, in a region mostly intended to cause the pressure of an air flow to rise, an air passage through which the air flow passes is divided. Therefore, blade areas of the vertexes of the projected portions are not effectively used, as a result of which there is a case where the pressure of the air flow will not be sufficiently raised. The propeller fan 1 isolates an air flow close to the boss 2, in which disturbance occurs, and an air flow which flows over the outer peripheral portion 6 of the blade 3 from an intermediate portion of the blade 3 that is intended to cause the pressure of air flow to rise, and regulates the air flows. Thus, the propeller fan 1 reduces separation of air flow, and reduces a pressure loss which is caused by separation of air flow or vortexes of air flow. Therefore, the propeller fan 1, an air-sending device using the propeller fan 1, and an air-conditioning apparatus using the air-sending device are capable of achieving high efficiency and low noise.

Figure 10:
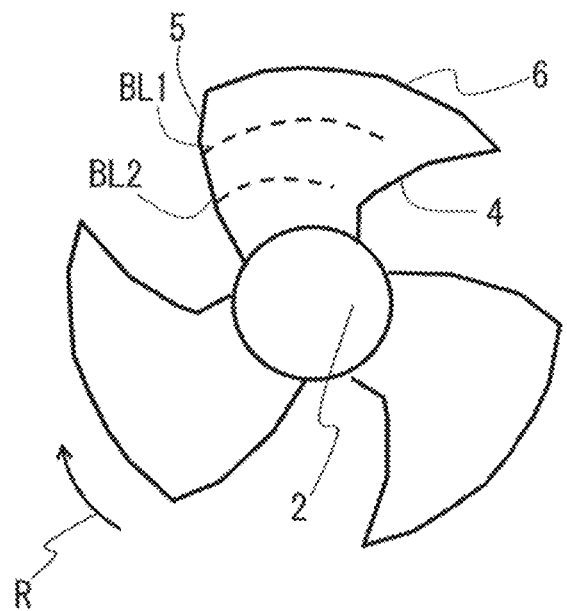
FIG. 10 is a schematic view illustrating another example of the propeller fan according to embodiment 1 of the present invention.

FIG. 10 is a schematic view illustrating another example of the propeller fan according to embodiment 1 of the present invention. With respect to the propeller fan 1 according to embodiment 1, it is described above that as illustrated in FIG. 5, the trailing edge of the blade is wavy in the rotation direction and in the counter-rotation direction from the inner side to the outer side, as the propeller fan 1 is viewed from the air flow downstream side. The above other example of the propeller fan according to embodiment 1 of the present invention will be described by referring to the shape of the leading edge 4 or trailing edge 5. In the propeller fan 1 according to embodiment 1, as illustrated in FIG. 10, the leading edge 4 is curved in the rotation direction such that the curvature of the leading edge 4 increases from the boss 2 side toward the outer peripheral portion 6, as the propeller fan 1 is viewed from the air flow downstream side.

Figure 11:
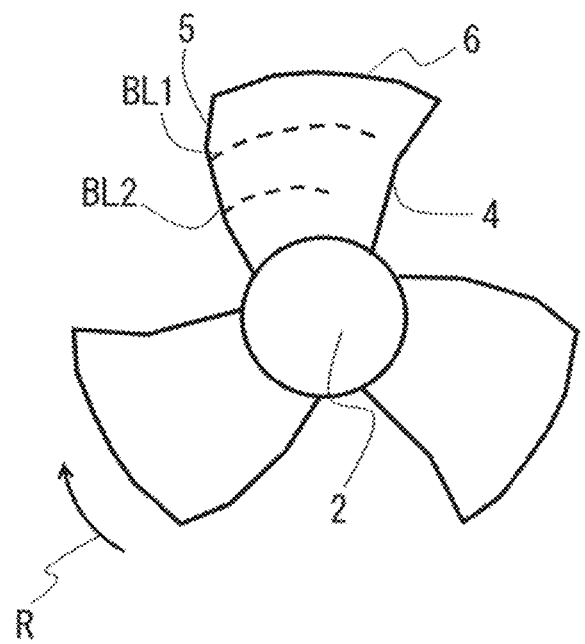
FIG. 11 is a schematic view illustrating still another example of the propeller fan according to embodiment 1 of the present invention.
Figure 12:
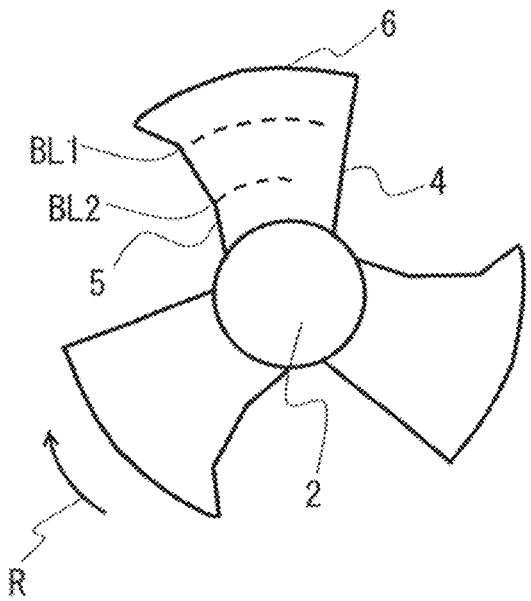
FIG. 12 is a schematic view illustrating a further example of the propeller fan according to embodiment 1 of the present invention.

FIG. 11 is a schematic view illustrating still another example of the propeller fan according to embodiment 1 of the present invention. The propeller fan 1 according to embodiment 1 may be formed such that as illustrated in FIG. 11, the leading edge 4 is gently curved in the rotation direction such that the curvature of the leading edge 4 slightly increases from the boss 2 side toward the outer peripheral portion 6, as the propeller fan 1 is viewed from the air flow FIG. 12 is a schematic view illustrating a further example of the propeller fan according to embodiment 1 of the present invention. In the propeller fan 1 according to embodiment 1, as illustrated in FIG. 12, the trailing edge 5 is curved in the opposite direction to the rotation direction such that the curvature of the trailing edge 5 increases from the boss 2 side toward the outer peripheral portion 6, as the propeller fan 1 is viewed from the air flow downstream side.

Embodiment 2

Figure 13:
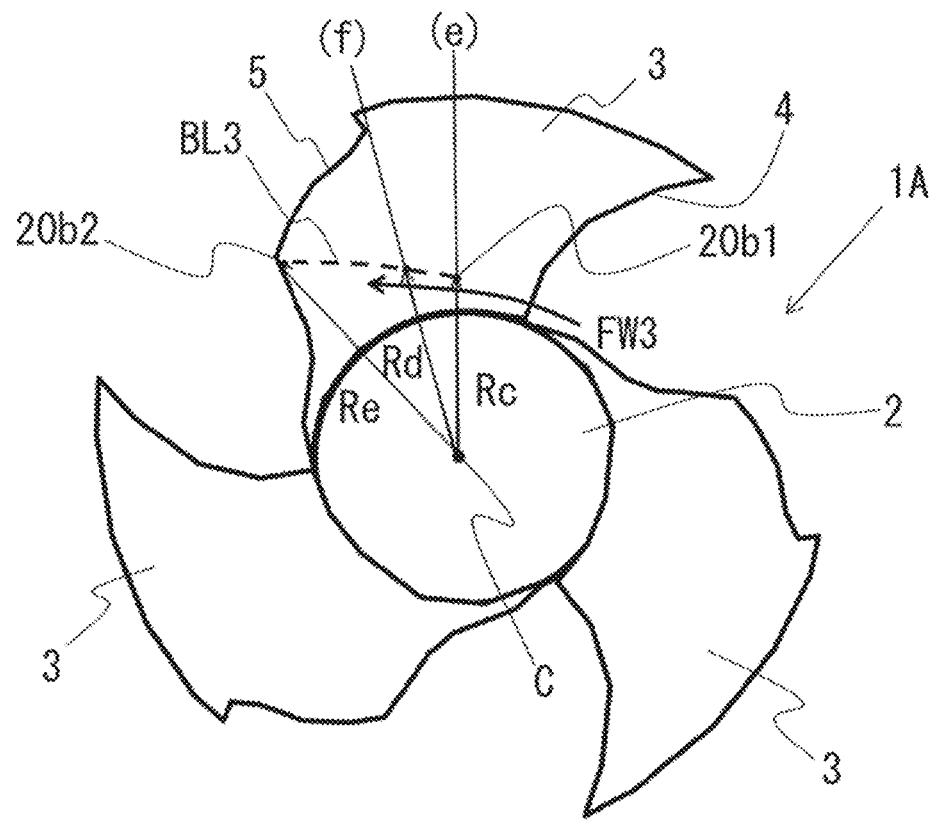
FIG. 13 is a top view of a propeller fan according to embodiment 2 of the present invention as viewed from the downstream side of air flow.
Figure 14:
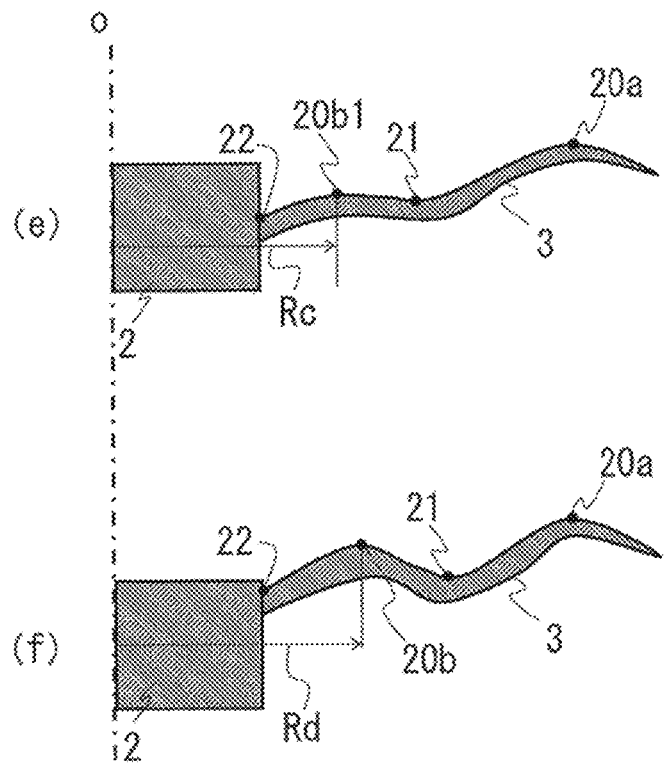
FIG. 14 illustrates radial cross-sectional views of each blade of the propeller fan according to embodiment 2 of the present invention.

FIG. 13 is a top view of a propeller fan according to embodiment 2 of the present invention as viewed from the downstream side of the air flow. FIG. 14 illustrates radial cross-sectional views of each blade of the propeller fan according to embodiment 2 of the present invention. FIG. 14 illustrates radial cross-sectional shapes of the blade 3, which are taken in the radial direction at two locations (e) and (f) between the leading edge 4 and trailing edge 5 of the blade 3 in FIG. 13. The cross section of each blade 3 of a propeller fan 1A according to embodiment 2 of the present invention will be described with reference to FIGS. 13 and 14. It should be noted that portions which have the same configurations as those of the propeller fan as illustrated in FIGS. 1 to 8 will be denoted by the same reference signs, and their descriptions will be omitted. With respect to the propeller fan according to embodiment 2 of the present invention, the position of the second maximum point 20b of the propeller fan as described above with respect to embodiment 1 will be specified in further detail.

In FIG. 13, dashed line BL3 indicates the position of the second maximum point 20b, which is defined in the cross section of the blade 3, on the blade surface. In a range from the leading edge 4 of the blade 3 toward the trailing edge 5 thereof in the rotation direction of the blade 3, a starting point at which the first one of the second maximum points 20b is located in the blade 3 will be referred to as the starting point 20b1, and the second maximum point 20b located at the trailing edge 5 will be referred to as an end point 20b2.

As illustrated in FIGS. 13 and 14, in the cross section (e), the distance from the central point C of the boss 2 to the starting point 20b1 in the cross section (e) in the radial direction is distance Rc. In the cross section (f), the distance from the central point C of the boss 2 to the second maximum point 20b in the cross section (f) in the radial direction is distance Rd. Furthermore, as illustrated in FIG. 13, the distance from the central point C of the boss 2 to the end point 20b2 in the radial direction is a distance Re. It should be noted that the central point C is part of the boss 2 through which the rotation axis O extends in the axial direction.

As illustrated in FIG. 13, in the propeller fan 1A according to embodiment 2 of the present invention, the distance Rd from the central point C of the boss 2 to the second maximum point 20b in the cross section (f) is greater than the distance Rc from the central point C of the boss 2 to the starting point 20b1 in the cross section (e). That is, the second maximum point 20b in the cross section (f) is formed outward of the starting point 20b1 in the cross section (e) in the radial direction. Furthermore, the distance Rd from the central point C of the boss 2 to the end point 20b2 located at the trailing edge 5 is greater than the distance Rd from the central point C of the boss 2 to the second maximum point 20b in the cross section (f). That is, the end point 20b2 located at the trailing edge 5 is located outward of the second maximum point 20b in the cross section (f) in the radial direction. In the propeller fan 1A, the second maximum points 20b are located such that the distance from the central point C of the boss 2 to the second maximum point 20b in the radial direction varies in accordance with the position of the second maximum point 20b from the starting point 20b1 to the trailing edge 5 of the blade 3, and increases from the starting point 20b1 toward the trailing edge 5.

In the existing propeller fan, an air flow passing over the blade surface of the blade is made by a centrifugal force to flow outwards in the radial direction, and as a result, an air flow disturbed by friction with the boss also flows outwards in the radial direction. In the propeller fan 1A, the second maximum points 20b are located such that the distance from the central point C of the boss 2 to the second maximum point 20b in the radial direction varies in accordance with the position of the second maximum point 20b from the starting point 20b1 to the trailing edge 5 of the blade 3, and increases from the starting point 20b1 toward the trailing edge 5. Therefore, the propeller fan 1A can regulate an air flow such that disturbed air flow close to the boss 2 does not flow into the center side of the blade 3. As a result, the propeller fan 1A, an air-sending device using the propeller fan 1A and an air-conditioning apparatus using the air-sending device can achieve a high efficiency and low noise. It should be noted that preferably, the second maximum points 20b be located from the starting point 20b1 to the end point 20b2 such that the distance from the central point C of the boss 2 to the second maximum point 20b in the radial direction varies in accordance with the position of the second maximum point 20 from the starting point 20b1 to the end point 20b, and gradually increases from the starting point 20b1 to the end point 20b. In this case, it is appropriate that the above distance in the radial direction varies in a linear fashion, for example, in the circumferential direction.

Embodiment 3

Figure 15:
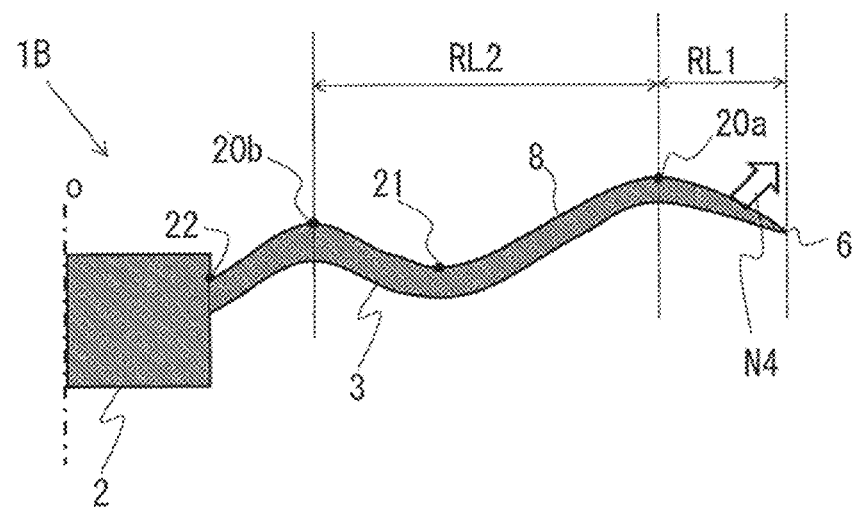
FIG. 15 is a schematic radial cross-sectional view of part of each blade of a propeller fan according to embodiment 3 of the present invention.

FIG. 15 is a schematic radial cross-sectional view of part of each blade of a propeller fan according to embodiment 3 of the present invention. FIG. 15 illustrates the radial cross section of part of each blade 3 of a propeller fan 1B, where the first maximum point 20a, the minimum point 21, the second maximum point 20b and the connection point 22 are located. Also, the radial cross-sectional view of each blade 3 of the propeller fan 1B as illustrated in FIG. 15 includes the rotation axis O.

Furthermore, in FIG. 15, the first maximum point 20a and the second maximum point 20b are indicated. Portions which have the same configurations as those of the propeller fans as illustrated in FIGS. 1 to 14, and their descriptions will thus be omitted. With respect to the propeller fan 1B according to embodiment 3 of the present invention, the relationship between the distance between the first maximum point 20a and the second maximum point 20b in the radial direction and the distance between the first maximum point 20a and the outer peripheral portion 6 in the radial direction in the propeller fan according to embodiment 1 will be specified in further detail.

As illustrated in FIG. 15, in the radial cross section of the blade 3, the distance between the first maximum point 20a and the outer peripheral portion 6 of the propeller fan 1B in the radial direction is distance RL1, and the distance between the first maximum point 20a and the second maximum point 20b in the radial direction is distance RL2. The propeller fan 1B is formed such that in the radial cross section of the blade 3, the distance RL2 between the first maximum point 20a and the second maximum point 20b is greater than the distance RL1 between the first maximum point 20a and the outer peripheral portion 6 of the blade 3.

In the area between the first maximum point 20a and the outer peripheral portion 6 of the propeller fan 1B, the normal N4 to the positive-pressure surface 8 that is a blade surface of the blade 3 is inclined toward the outer side in the radial direction, and an air flow easily leaks outwards from the outer side in the radial direction; that is, easily flows out from the outer side. Therefore, even in the case where the flow rate of air flow passing over the area between the first maximum point 20a and the outer peripheral portion 6 of the propeller fan 1B is increased, it is hard to improve the performance of the propeller fan. By contrast, the area between the second maximum point 20b and the first maximum point 20a is an area where an air flow flows on an inner side than the first maximum point 20a in the radial direction, as a result of which a desired pressure can be obtained by increasing the flow rate of air. Since the propeller fan 1B is formed such that the distance RL2 is greater than the distance RL1 in the radial cross section of the blade 3, the region where a desired pressure is obtained by increasing the flow rate of air is large. Therefore, the propeller fan 1B, an air-sending device using the propeller fan 1B and an air-conditioning apparatus using the air-sending device can achieve a high efficiency.

The area between the position of the first maximum point 20a and the outer peripheral portion 6 is an area where the pressure difference between the top surface and the back surface of the blade 3 is reduced, and where the pressure of the air flow cannot be raised by the propeller fan 1B. Therefore, it is preferable that the first maximum point 20a be located outward of a location corresponding to 90% of the outside diameter of the propeller fan 1B from the rotation axis O.

Embodiment 4

Figure 16:
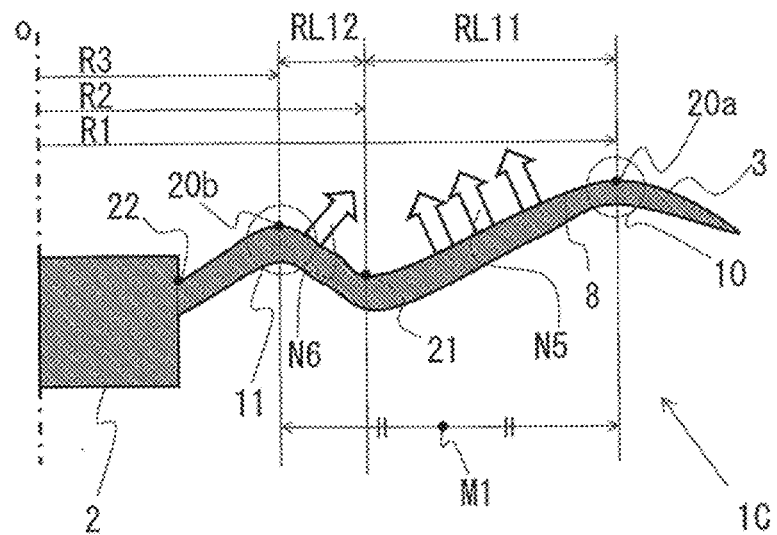
FIG. 16 is a schematic radial cross-sectional view of part of each blade of a propeller fan according to embodiment 4 of the present invention.

FIG. 16 is a schematic radial cross-sectional view of part of each blade of a propeller fan according to embodiment 4 of the present invention. FIG. 16 is a radial cross-sectional view of part of each blade 3 of a propeller fan 1C, which includes the rotation axis O. In FIG. 16, the first maximum point 20a and the second maximum point 20b are indicated. Portions which have the same configurations as those of the propeller fans as illustrated in FIGS. 1 to 15 will be denoted by the same reference signs, and their descriptions will thus be omitted. With respect to the propeller fan 1C according to embodiment 4 of the present invention, the distance between the first maximum point 20a and the minimum point 21 in the radial direction and the distance between the minimum point 21 and the second maximum point 20b in the radial direction in the propeller fan according to embodiment 1 will be described in further detail.

As illustrated in FIG. 16, in the radial cross section of the blade 3, the difference between the distance R1 from the rotation axis O to the first maximum point 20a in the radial direction and the distance R2 from the rotation axis O to the minimum point 21 in the radial direction is distance RL11. The difference between the distance R2 from the rotation axis O to the minimum point 21 in the radial direction and the distance R3 from the rotation axis O to the second maximum point 20b in the radial direction is distance RL12. That is, the distance between the first maximum point 20a and the minimum point 21 in the radial direction is distance RL11, and the distance between the minimum point 21 and the second maximum point 20b in the radial direction is distance RL12.

In the propeller fan 1C, the distance RL11 is greater than the distance RL12. In other words, in the radial cross section of the blade 3, the minimum point 21 is located inward of a middle position M1 between the position of the first maximum point 20a in the radial direction and the position of the second maximum point 20b in the radial direction.

With reference to FIG. 16, the directions in which the normal N5 and the normal N6 to the downstream-side blade surface of the blade 3 are inclined will be referred to. Since the blade 3 has the outer-side curved portion 10, the normal N5 to the positive-pressure surface 8 of the blade 3 is inclined toward the inner side in the radial direction, in an area of the positive-pressure surface 8, which is located from the minimum point 21 to the first maximum point 20a on the outer side in the radial direction. On the other hand, since the blade 3 has the inner-side curved portion 11, the normal N6 to the positive-pressure surface 8 is inclined toward the outer side in the radial direction, in an area of the positive-pressure surface 8, which is located from the minimum point 21 to the second maximum point 20b on the inner side in the radial direction.

In the propeller fan 1C, in the radial cross section of the blade 3, the minimum point 21 is located inward, in the radial direction, of the middle position M1 between the position of the first maximum point 20a in the radial direction and the position of the second maximum point 20b in the radial direction. Therefore, the blade 3 is formed such that the distance RL11 is greater than the distance RL12. Because of the above configuration of the blade 3, the area where the normal N5 to the positive-pressure surface 8 of the blade 3 is inclined toward the inner side in the radial direction is wider than the area where the normal N6 to the positive-pressure surface 8 of the blade 3 is inclined toward the outer side in the radial direction. Therefore, an air flow flowing over the positive-pressure surface 8 of the blade 3 can be caused to pass over the area between the first maximum point 20a and second maximum point 20b of the positive-pressure surface 8, that is, an air flow which can rise in pressure can be prevented from flowing only on the outer side of the blade 3 in the radial direction. As a result, it is possible to reduce flowing of the air flow toward the outer side of the blade 3, and reduce a pressure loss which is caused by flowing of the air flow only on the outer side. Therefore, the propeller fan 1C, an air-sending device using the propeller fan 1C and an air-conditioning apparatus using the air-sending device are able to achieve a high efficiency and low noise.

Embodiment 5

Figure 17:
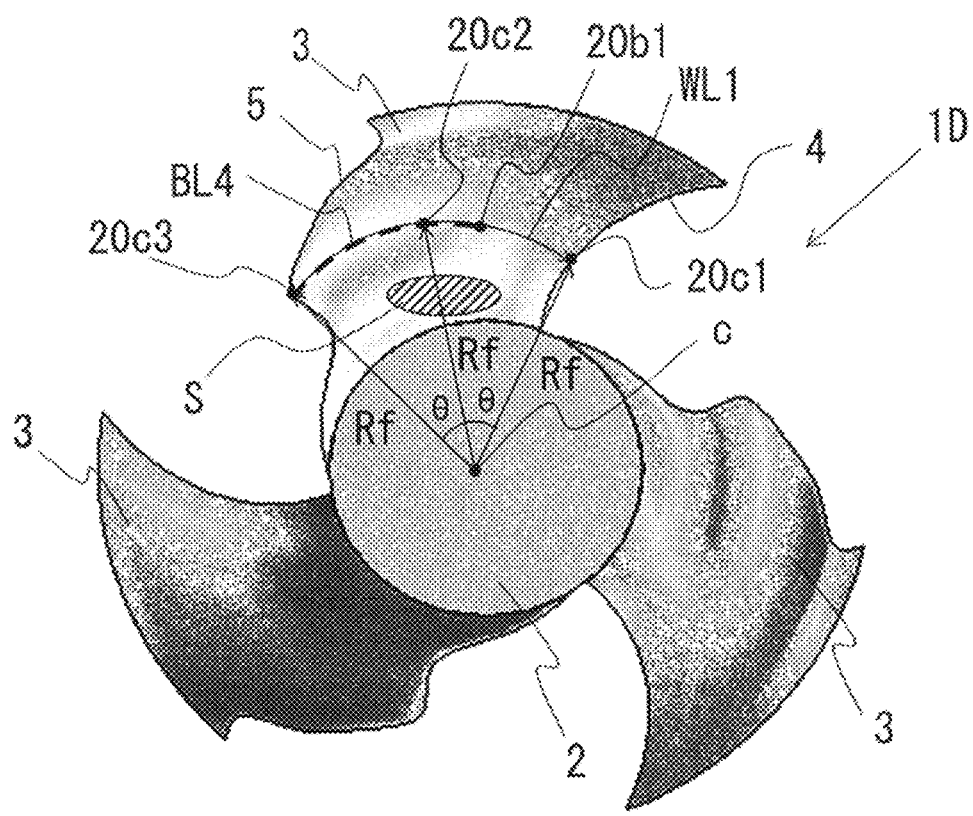
FIG. 17 is a top view of a propeller fan according to embodiment 5 of the present invention as viewed from the downstream side.

FIG. 17 is a top view of a propeller fan according to embodiment 5 of the present invention as viewed from the downstream side. With respect to a propeller fan 1D according to embodiment 5 of the present invention, the position of the starting point 20*b*1 in the propeller fan according to embodiment 1 will be specified in further detail. Portions which have the same configurations as those of the propeller fans as illustrated in FIGS. 1 to 16 will be denoted by the same reference signs, and their descriptions will thus be omitted.

In FIG. 17, radius Rf is a distance from the central point C of the boss 2 to the second maximum point 20*b* in the blade 3 in the propeller fan 1D. The central point C is part of the boss 2 through which the rotation axis O extends in the axial direction. In FIG. 17, a solid line indicating a distance WL1 is a locus of rotation in the rotation direction, which connects endpoints of radii Rf having the same length, and the distance WL 1 is a distance in the rotation direction between a starting point 20*c*1 and an end point 20*c*3, the starting point 20*c*1 being a point at which the leading edge 4 of the blade 3 and the radius Rf located at the leading edge 4 intersect each other, the end point 20*c*3 being a point at which the trailing edge 5 of the blade 3 and the radius Rf located at the trailing edge 5 intersect each other. A middle point 20*c*2 is a middle point of a range corresponding to the distance WL1. An angle θ between a radius Rf connecting the rotation axis O to the starting point 20*c*1 and a radius Rf connecting the rotation axis O to the middle point 20*c*2 is equal to an angle θ between the radius Rf connecting the rotation axis O to the middle point 20*c*2 and a radius Rf connecting the rotation axis O to the end point 20*c*3. In FIG. 17, dashed line BL4 indicates the positions of second maximum points 20*b* in radial blade cross sections of the blade 3, which include the rotation axis O, on the blade surface of the blade 3. In the range from the leading edge 4 to the trailing edge 5 in the rotation direction R of the blade 3, a starting point at which the first one of the second maximum points 20*b* is located in the blade 3 is the starting point 20*b*1. The position at which the starting point 20*b*1 is located is based on the result of an air-flow analysis.

On a line extending in the rotation direction R of the propeller fan 1D and connecting endpoints of the radii Rf having the same length, the starting point 20*b*1 of the second maximum point 20*b* is closer to the leading edge 4 than a point which is located away from the reading edge 4 of the blade 3 by 50% of the distance WL1 between the leading edge 4 of the blade 3 and the trailing edge 5 of the blade 3 in the rotation direction.

Because of friction between the side wall of the boss 2 and an air flow, vortexes of air which develop on the surface of the blade 3 are generated from an area S indicated by hatching in FIG. 17. In the propeller fan 1D, on the locus in the rotation direction R of the propeller fan 1D, which connects endpoints of the radii Rf having the same length, the starting point 20*b*1 of the second maximum point 20*b* is located closer to the leading edge 4 than a position corresponding to 50% of the distance WL1 from the leading edge 4 of the blade 3 in the rotation direction between the leading edge 4 of the blade 3 and the trailing edge 5 of the blade 3. Therefore, the propeller fan 1D can control the air flow such that disturbed air flow close to the boss 2 does not flow to the center side of the blade 3, and can regulate the air flow flowing over the positive-pressure surface 8 of the blade 3. As a result, the propeller fan 1D, an air-sending device using the propeller fan 1D and an air-conditioning apparatus using the air-sending device can achieve a high efficiency and low noise.

Embodiment 6

Figure 18:
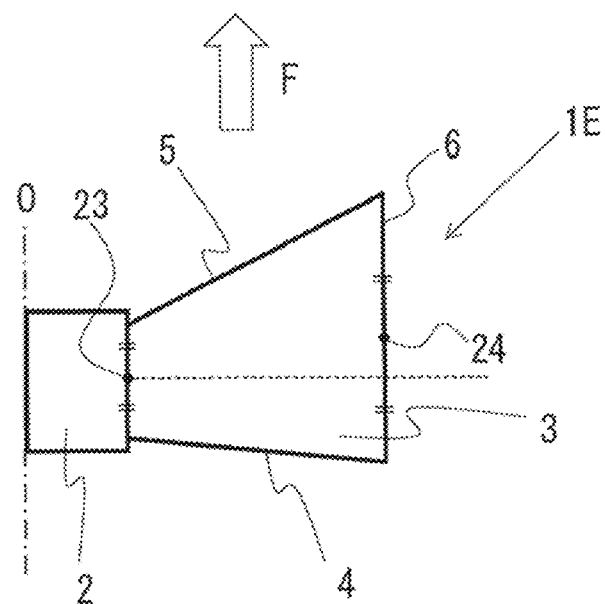
FIG. 18 is a schematic cross-sectional view of part of a propeller fan according to embodiment 6 of the present invention.

FIG. 18 is a schematic cross-sectional view of part of a propeller fan according to embodiment 6 of the present invention. FIG. 18 is a view (rotation projection view) illustrating in a cross section of the blade 3, which is taken along the line A-A in FIG. 1, and is projected when a propeller fan 1E is rotated about the rotation axis O. Portions which have the same configurations as those of the propeller fans as illustrated in FIGS. 1 to 17 will be denoted by the same reference signs, and their descriptions will thus be omitted.

As illustrated in FIG. 18, in the propeller fan 1E, in the cross section of the blade 3 which is projected in the rotation direction, a middle point 24 between the leading edge 4 and trailing edge 5 of the blade 3 at the outer peripheral portion 6 is located downstream of, in the air flow, a middle point 23 between the leading edge 4 and trailing edge 5 of the blade 3 at a connection portion between the blade 3 and the boss 2.

In the case where the blade 3 is formed such that the middle point 24 is located downstream of, in the air flow, the middle point 23, in the region where the normal to the positive-pressure surface of the blade 3 is inclined toward the inner side in the radial direction in the propeller fans according to embodiments 1 to 5 of the present invention, the normal greatly tends to be inclined toward the inner side in the radial direction. Therefore, an air flow passing along the positive-pressure surface 8 of the blade 3 is prevented from flowing only on the outer side of the propeller fan 1E. It should be noted that the normal to the positive pressure surface is inclined toward the outer side, for example, in the region from the second maximum point to the minimum point; however, in the entire blade 3, the normal to the pressure surface greatly tends to be inclined toward the inner side in the blade 3, as compared with the propeller fans according to embodiments 1 to 5 of the present invention. Thus, the blade 3 more strongly causes the air flow to flow inwards. It is therefore possible to reduce flowing of the air flow toward the outer side of the blade 3 in the radial direction, and thus leakage of the air flow, thereby reducing a pressure loss which is caused by flowing of the air flow on the outer side only. Accordingly, the propeller fan 1E, an air-sending device using the propeller fan 1E and an air-conditioning apparatus using the air-sending device can achieve a high efficiency and low noise.

Embodiment 7

Figure 19:
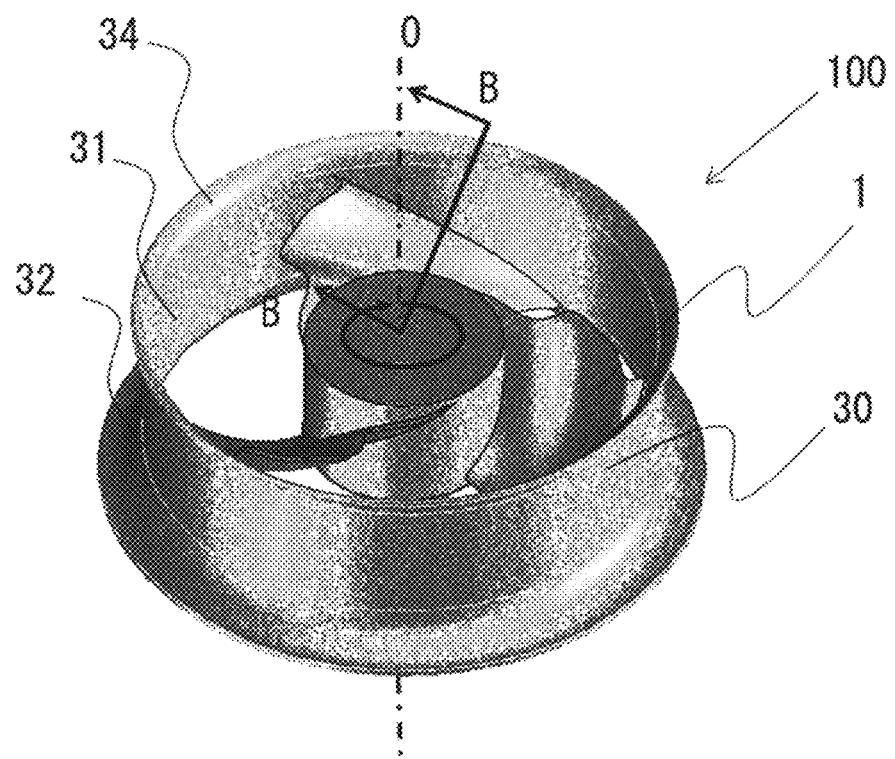
FIG. 19 is a configuration view of a combination of a propeller fan and a bell mouth that are used in an air-sending device according to embodiment 7 of the present invention.

FIG. 19 is a configuration view of a combination of a propeller fan and a bell mouth which are used in an air-sending device according to embodiment 7 of the present invention. An air-sending device 100 according to embodiment 7 of the present invention is an air-sending device provided with any one of the propeller fans according to embodiments 1 to 6 of the present invention. Portions which have the same configurations as those of the propeller fans of FIG. 1 to FIG. 18 will be denoted by the same reference signs, and their descriptions will thus be omitted. As the propeller fan, any one of the propeller fans 1 to 1E according to embodiments 1 to 6 of the present invention is provided. In the following description, as a representative of those propeller fans, the propeller fan 1 is described, and the descriptions of the other propeller fans are omitted.

As illustrated in FIG. 19, the air-sending device 100 includes a bell mouth 30 which is provided outward of the propeller fan 1 in the radial direction, and which surrounds the propeller fan 1. That is, the propeller fan 1 is provided inward of the bell mouth 30, which is annularly shaped, in the radial direction, and is surrounded by the bell mouth 30. It is ensured that the propeller fan 1 and the bell mouth 30 are spaced from each other by a predetermined distance.

Figure 20:
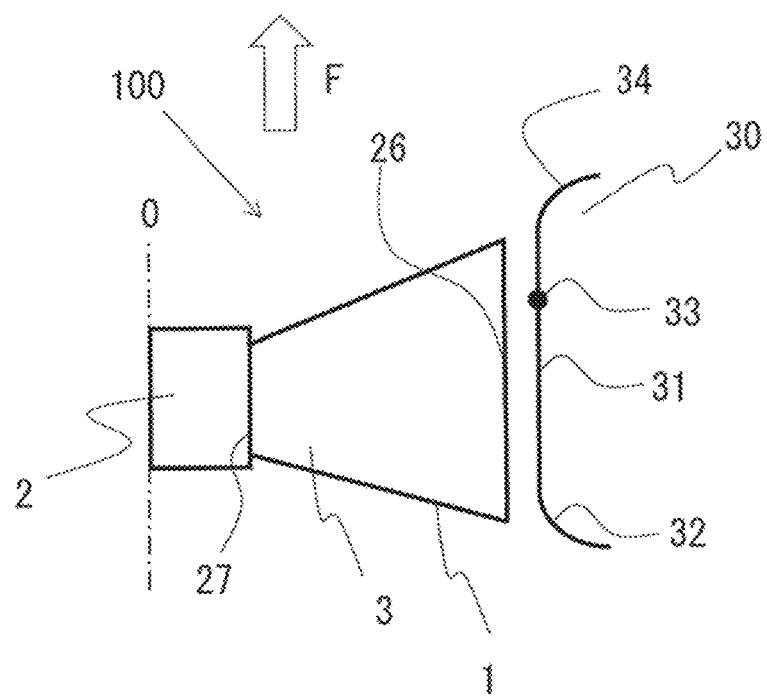
FIG. 20 is a radial cross-sectional view taken along line B-B in FIG. 19, including the rotation axis.

FIG. 20 is a radial cross-sectional view taken along line B-B in FIG. 19, which includes the rotation axis. FIG. 20 is a view (rotation projection view) illustrating a projection of the blade 3 in a cross section of the blade 3, which is taken along the line B-B in FIG. 19, the projection of the blade 3 being an image projected in the cross section when the propeller fan 1 is rotated about the rotation axis O. The projection of the outer peripheral portion 6 of the propeller fan 1 in the cross section will be referred to as an outer periphery 26, and the projection of the inner peripheral portion 7 in the cross section will be referred to as inner periphery 27. The outer periphery 26 projected during the rotation of the blade 3 has a substantially cylindrical shape.

The configuration of the bell mouth 30 will be described with reference to FIGS. 19 and 20. A duct portion 31 is a cylindrical portion of the bell mouth 30, which surrounds the propeller fan 1 in proximity to the propeller fan 1 in a cylindrical projection of the duct portion 31. An inlet portion 32 of the bell mouth 30 is located upstream of the duct portion 31 in the air flow, and is a portion where the area of an air passage decreases from the upstream side toward the downstream side in the air flow. A proximity point 33 indicates a portion at which the bell mouth 30 is the closest to the blade 3. The proximity point 33 is not limited to a single point, and may be an area. That is, whether the proximity point 33 is a single point or an area depends on the shape of the bell mouth 30. An outlet portion 34 is located downstream of the duct portion 31 in the air flow, and is a portion where the area of the air passage increases from the upstream side toward the downstream side in the air flow. It should be noted that in FIG. 19, the outlet portion 34 is depicted such that its cross section widens in the shape of a circular arc, but may be provided to form a gently curved surface as well as the inlet portion 32. Furthermore, the bell mouth 30 may include a region that does not continuously widen toward the outer side midway, in a region where the outlet portion 34 is formed.

The duct portion 31 has a function of holding the pressure difference between the upstream side of an air flow whose pressure is raised by the blade 3 and the downstream side of the air flow. Therefore, in order to avoid leakage of the air flow, the space between the blade 3 and the bell mouth 30 is generally set to fall within the range of 0% of the fan diameter to approximately 3% of the fan diameter. In the case where the bell mouth 30 is formed by subjecting metal to press working, the duct portion 31 is formed in the shape of a cylinder having a substantially constant inside diameter. In the case where the bell mouth 30 is formed of resin, the duct portion 31 is provided with a several-percent draft in a draft direction, which is provided to remove a die after molding, and the inside diameter of the duct portion 31 varies in the rotation axis direction.

Figure 21:
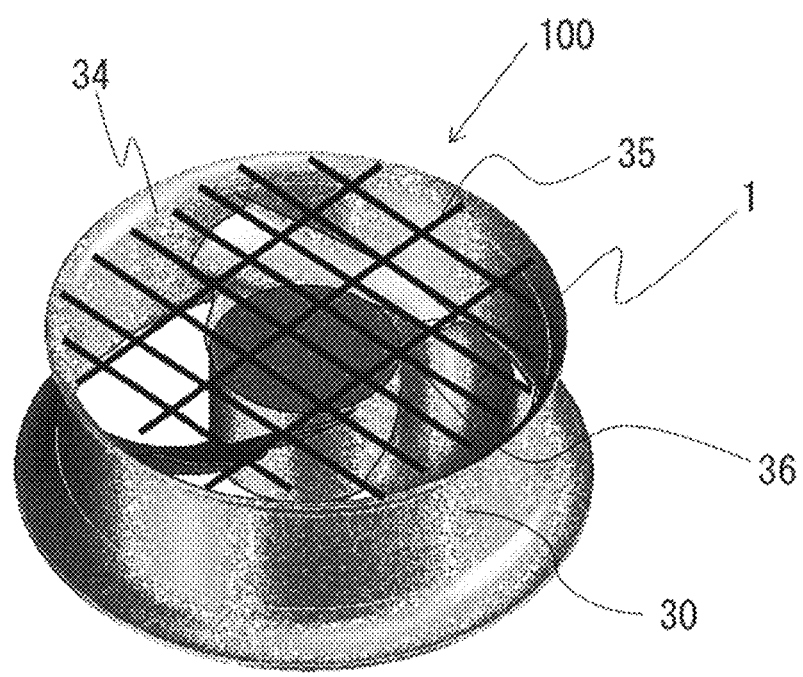
FIG. 21 is a perspective view illustrating an example of the configuration of the air-sending device according to embodiment 7 of the present invention as viewed from the downstream side.

FIG. 21 is a perspective view of an example of the configuration of the air-sending device according to embodiment 7 of the present invention, as viewed from the downstream side of the air flow. As illustrated in FIG. 21, the air-sending device 100 according to embodiment 7 of the present invention includes a mesh protective guard 35 attached to the outlet portion 34 of the bell mouth 30, which allows an air flow to flow out of the bell mouth 30. The protective guard 35 is made up of a plurality of crisscrossed bars 36 disposed in a lattice pattern.

The protective guard 35 is attached to prevent a finger of a person or a foreign matter from contacting the blades 3 during rotation of the blades 3. Furthermore, it should be noted that if an air flow from the propeller fan 1 flows on one side only, its air velocity increases, thus increasing a pressure loss or disturbance of air flow which occurs when air passes through the bars 36. However, in the air-sending device 100 according to embodiment 7 of the present invention, because of provision of the protective guard 35, the velocity of an air flow to flow out can be made uniform. Thus, the velocity of an air flow passing through the bars 36 can be reduced, as compared with existing air-sending devices, and the pressure loss or noise can be reduced. As a result, the air-sending device 100 and an air-conditioning apparatus including the air-sending device 100 can achieve a high efficiency and noise reduction.

Embodiment 8

Figure 22:
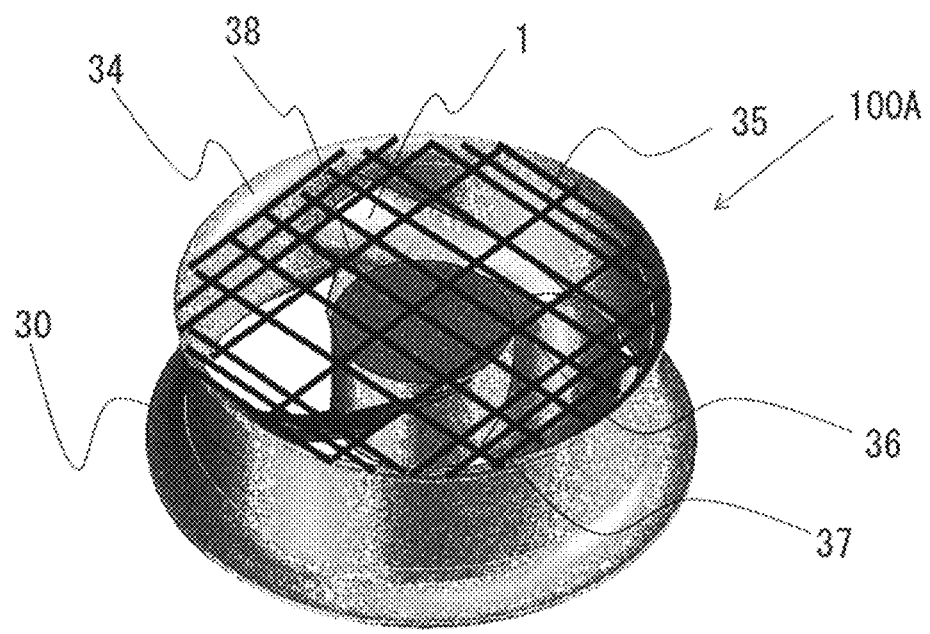
FIG. 22 is a perspective view illustrating an example of the configuration of an air-sending device according to embodiment 8 of the present invention as viewed from the downstream side.

FIG. 22 is a perspective view illustrating an example of the configuration of an air-sending device according to embodiment 8 of the present invention as viewed from the downstream side of the air flow. The air-sending device according to embodiment 8 of the present invention is an air-sending device provided with any one of the propeller fans according to embodiments 1 to 6 of the present invention. Portions which have the same configurations as those of the propeller fans and air-sending device as illustrated in FIGS. 1 to 21 will be denoted by the same reference signs, and their descriptions will thus be omitted. As the propeller fan, any one of the propeller fans 1 to 1E according to embodiments 1 to 6 of the present invention is provided. In the following description, as a representative of those propeller fans, the propeller fan 1 is described, and the descriptions of the other propeller fans are omitted.

Generally, in the case where an air-sending device is installed outdoors, a flying object, a falling object or the like can strike collide with a protective guard to apply a strong impact on the protective guard. Therefore, in order to prevent breakage of the protective guard, the strength of the protective guard needs to be increased by decreasing the pitch of the bars. It should be noted that to increase the strength of the protective guard, the material of the protection guard needs to have a high strength. However, the cost of material having a high strength is high. In view of this, as is often the case, air-sending devices in which bars close to edges of a bell mouth are arranged at a higher density to increase the strength of a protective guard are adopted, since they can be easily manufactured without considering the cost of material. However, in the existing air-sending device, since an air flow is made by a centrifugal force to flow only over the outer portion where the pitch of the bars is small, the ventilation resistance to the air flow is increased. Also, noise is made bigger by disturbance of air flow which occurs at the bars.

The air-sending device 100A according to embodiment 8 of the present invention is provided with the bell mouth 30 and the mesh protective guard 35. The bell mouth 30 surrounds the propeller fan 1 from the outer side in the radial direction. The protective guard 35 is attached to the outlet portion 34 of the bell mouth 30, the outlet portion 34 allowing the air flow to flow out of the bell mouth. The protective guard 35 is provided with meshes 37, and of the meshes 37, meshes 37 located on a radially outer side of the air-sending device are smaller than meshes 38 located on a radially inner side of the air-sending device. That is, in the air-sending device 100A, the mesh protective guard 35 is provided at the outlet portion 34 of the bell mouth 30. In the mesh protective guard 35, the bars 36 are disposed such that the meshes 37 on the radially outer side are located at a higher density on the meshes 37 on the radially inner side. In addition, the air-sending device 100A according to embodiment 8 of the present invention is provided with any one of the propeller fans 1 to 1E according to embodiments 1 to 6 of the present invention. Therefore, in the air-sending device 100A according to embodiment 8 of the present invention, the air flow to flow out is made uniform in the radial direction, whereby the velocity of air passing through the bars 36 located at a higher density, that is, the bars 36 arranged at a small pitch, is reduced. As a result, in the air-sending device 100A according to embodiment 8 of the present invention, the ventilation resistance of the protective guard 35 to the air flow is reduced. Thus, a high efficiency and noise reduction are achieved by the air-sending device 100A and an air-conditioning apparatus provided with the air-sending device 100A. In addition, since the bars 36 are disposed such that the meshes 37 on the radially outer side of the air-sending device 100A are smaller than the meshes 38 on the radially inner side of the air-sending device 100A, the strength of the protective guard 35 is increased.

Embodiment 9

Figure 23:
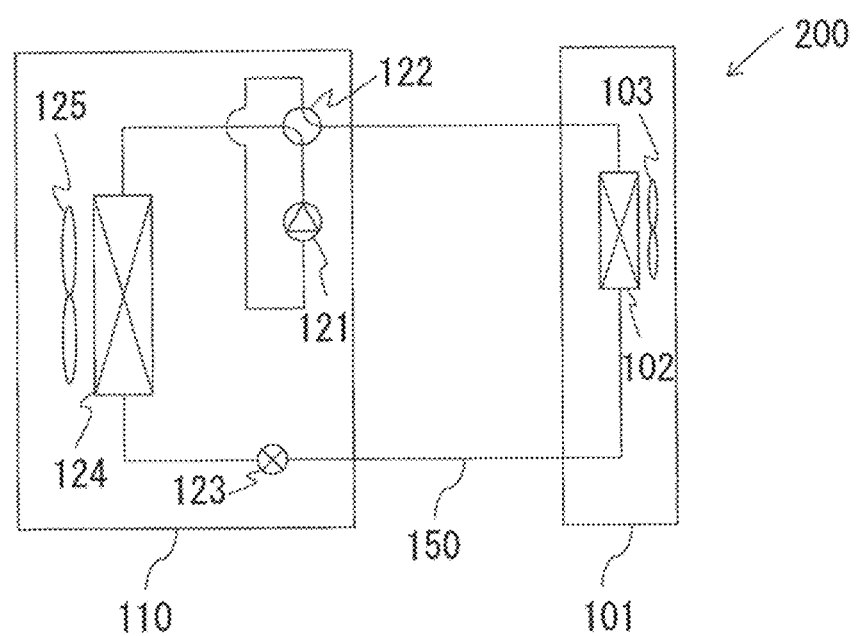
FIG. 23 is a configuration diagram of an air-conditioning apparatus according to embodiment 9 of the present invention.
Figure 24:
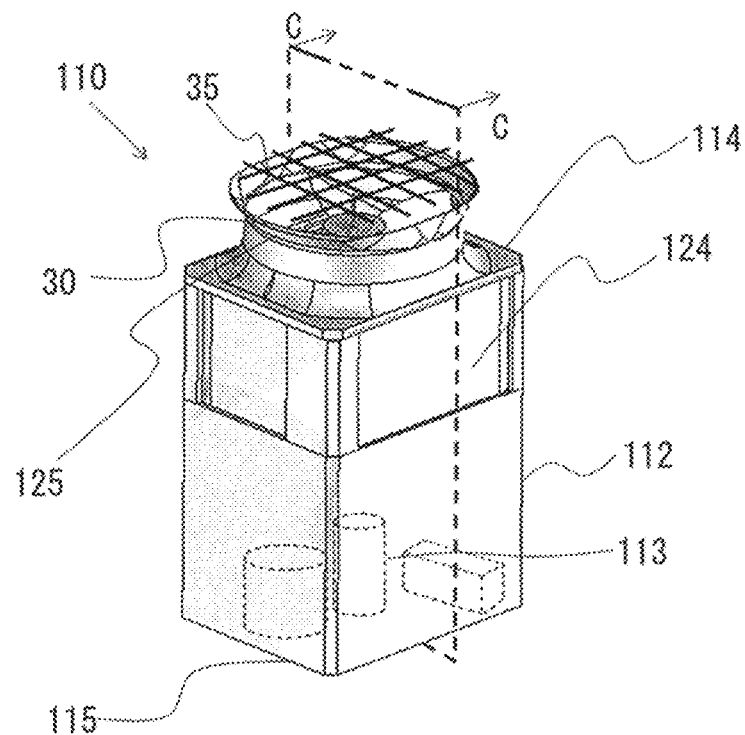
FIG. 24 is a perspective view illustrating an example of the configuration of an outdoor unit of the air-conditioning apparatus according to embodiment 9 of the present invention.
Figure 25:
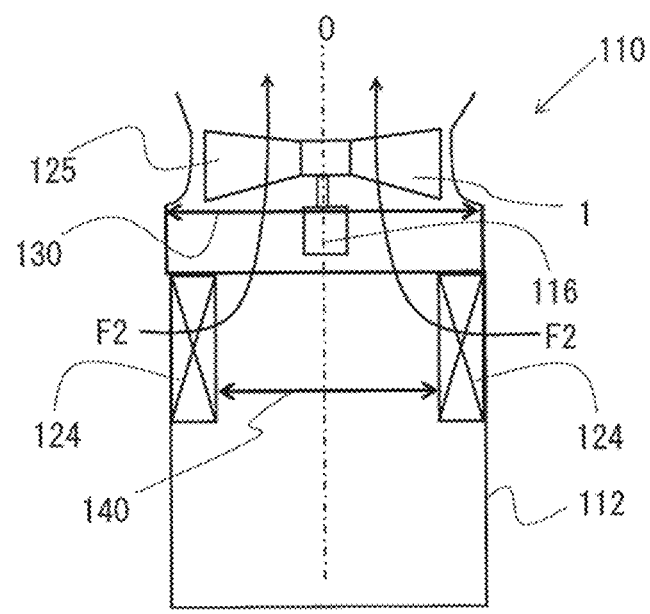
FIG. 25 is a cross-sectional view of the outdoor unit, which is taken along line C-C in FIG. 24.

FIG. 23 is a configuration view of an air-conditioning apparatus according to embodiment 9 of the present invention. FIG. 24 is a perspective view illustrating an example of the configuration of an outdoor unit of the air-conditioning apparatus according to embodiment 9 of the present invention. FIG. 25 is a cross-sectional view of the outdoor unit, which is taken along line C-C in FIG. 24. The air-conditioning apparatus according to embodiment 9 of the present invention will be described with reference to FIGS. 23 to 25. The air-conditioning apparatus according to embodiment 9 of the present invention will be described by referring mainly to differences between the air-conditioning apparatus according to embodiment 9 and the propeller fans and the air-sending devices according to embodiments 1 to 8 of the present invention. Portions which have the same configurations as those of the propeller fans and the air-sending devices according to embodiments 1 to 8 of the present invention will be denoted by the same reference signs, and their descriptions will thus be omitted. The following description is made by referring to the case where the propeller fan according to embodiment 1 of the present invention is applied to an outdoor unit 110; however, any one of the propeller fans and the air-sending devices according to embodiments 2 to 8 of the present invention is applicable to the outdoor unit 110.

As illustrated in FIG. 23, the air-conditioning apparatus 200 includes an indoor unit 101 and the outdoor unit 110. The indoor unit 101 and the outdoor unit 110 are connected by a refrigerant pipe 150, and refrigerant is circuited between these units, whereby a refrigeration cycle is provided.

The indoor unit 101 includes an indoor-side heat exchanger 102 and an indoor-side air-sending device 103. The indoor-side heat exchanger 102 causes heat exchange to be performed between outside air and refrigerant. The indoor-side heat exchanger 102 operates as a condenser during heating operation, and operates as an evaporator during cooling operation. The indoor-side air-sending device 103 circulates air to cause heat exchange to be efficiently performed.

As illustrated in FIG. 24, the outdoor unit 110 includes an outdoor-side air-sending device 125. Also, as illustrated in FIG. 24, the outdoor unit 110 includes a casing 112 and internal devices 113 provided in the casing 112. An upper portion of the casing 112 is covered with a top plate 114, and a bottom plate 115 is connected to a lower portion of the casing 12. To the top plate 114, a bell mouth 30 is attached. The bell mouth 39 surrounds an air outlet. At a downstream portion of the bell mouth 30, a protective guard 35 is provided. Furthermore, as illustrated in FIG. 25, a motor 116 which drives the propeller fan 1 is provided under the propeller fan 1. As the internal devices 113, for example, a compressor 121, a flow switching device 122, an expansion device 123 and outdoor-side heat exchangers 124 are provided as illustrated in FIG. 23.

As the outdoor-side air-sending device 125, the air-sending device 100 according to embodiment 7 of the present invention or the air-sending device 100A according to embodiment 8 of the present invention is used. The outdoor-side air-sending device 125 is an air-sending unit including the propeller fan 1, and circulates air to cause heat exchange to be performed efficiently. In FIG. 25, the propeller fan 1 is illustrated; however, any one of the propeller fan 1A to the propeller fan 1E according to embodiments 2 to 6 of the present invention may be used.

The compressor 121 compresses sucked refrigerant into high-temperature, high-pressure gas refrigerant, and discharges the gas refrigerant. The flow switching device 122 switches the flow of refrigerant between that during cooling operation and that during heating operation based on an instruction from a controller (not illustrated). The expansion device 123 adjusts the pressure of refrigerant, etc., by changing its opening degree. The outdoor-side heat exchangers 124 causes heat exchange to be performed between outside air and refrigerant. The outdoor-side heat exchangers 124 operates as an evaporator during heating operation, and operates as a condenser during cooling operation. The outdoor-side heat exchangers 124 are disposed at inner sides of the casing 112 in such a way as to face each other as illustrated in FIG. 25.

It is preferable that the outdoor unit 110 be made such that it can be installed at the smallest possible area, in order that the outdoor unit 110 could be installed at a larger number of places, and could be easily installed. Also, it is preferable that the propeller fan 1 be formed to have a greater diameter to reduce noise made by air sent by the propeller fan 1. The unit width of the outdoor unit 110 may be close to approximately the outside diameter of the propeller fan 1. The outdoor unit 110 is configured such that the distance 140 between sides of the outdoor-side heat exchangers 124, which faces each other in the casing 112, is less than the width 130 of a most upstream portion of the bell mouth 30. Therefore, in the outdoor unit 110, when air flow F2 which has passed through the outdoor-side heat exchangers 124 flows toward the outdoor-side air-sending device 125, the air flow F2 flows to an axis side of the rotation axis O, and air flows to an inner peripheral side of the outdoor-side air-sending device 125. Since any one of the propeller fans according to embodiments 1 to 6 of the present invention is applied to the outdoor unit 110, an air flow is prevented from flowing only on the outer side of the outdoor-side air-sending device 125, and the outdoor-side air-sending device 125 is thus efficiently operated. Therefore, a high efficiency and noise reduction are achieved by the air-conditioning apparatus 200.

Embodiments of the present invention are not limited to embodiments 1 to 9 as described above. For example, the air-conditioning apparatus is applicable to, for example, a room air conditioner, a packaged air-conditioner, a multi-split type air conditioners for building, a heat pump water heater or the like, and a refrigeration device such as a show case. In addition, the propeller fans 1 to 1E according to embodiments 1 to 6 of the present invention or the air-sending device 100 and the air-sending device 100A according to embodiments 7 and 8 of the present invention may be used as the indoor-side air-sending device 103 of the indoor unit 101.

REFERENCE SIGNS LIST 1 propeller fan 1A propeller fan 1B propeller fan 1C propeller fan 1D propeller fan 1E propeller fan 2 boss 3 blade 4 leading edge 5 trailing edge 6 outer peripheral portion 7 inner peripheral portion 8 positive-pressure surface 9 negative-pressure surface 10 outer-side curved portion 11 inner-side curved portion 12 valley-shaped portion 20a first maximum point 20a1 starting point 20b second maximum point 20b1 starting point 20b2 end point 20c1 starting point 20c2 middle point 20c3 end point 21 minimum point 22 connection point 23 middle point 24 middle point 26 outer periphery 27 inner periphery 30 bell mouth 31 duct portion 32 inlet portion 33 proximity point 34 outlet portion 35 protective guard 36 bar 37 mesh 38 mesh 100 air-sending device 100A air-sending device 101 indoor unit 102 indoor-side heat exchanger 103 indoor-side air-sending device 110 outdoor unit 112 casing 113 internal device 114 top plate 115 bottom plate 116 motor 121 compressor 122 flow switching device 123 expansion device 124 outdoor-side heat exchanger 125 outdoor-side air-sending device 150 refrigerant pipe 200 air-conditioning apparatus

The invention claimed is:
1. A propeller fan comprising:
a boss connected to a rotary shaft of a driving device; and
a plurality of blades provided at an outer periphery of the boss, and configured to send air in a direction along a rotation axis,
wherein in a cross section of each of the plurality of blades in a radial direction thereof, each blade includes,
an outer-side curved portion formed close to an outer peripheral portion of the blade and curved in such a way as to project toward a downstream side of an air flow,
an inner-side curved portion formed between the outer-side curved portion and the boss and curved in such a way as to project toward the downstream side of the air flow,
first maximum points at each of which a plane perpendicular to the rotation axis is tangent to part of a positive-pressure surface of the blade, which corresponds to a positive-pressure surface of the outer-side curved portion,
second maximum points at each of which a plane perpendicular to the rotation axis is tangent to part of the positive-pressure surface of the blade, which corresponds to a positive-pressure surface of the inner-side curved portion,
minimum points at each of which a plane perpendicular to the rotation axis is tangent to part of the positive-pressure surface of the blade, which corresponds to a positive-pressure surface of a valley-shaped portion curved in such a way as to be recessed between the first maximum point and the second maximum point, and
a connection point at which the boss contacts with the positive-pressure surface of the blade,
wherein between a leading edge and a trailing edge of the blade in a rotation direction of the blade, a starting point at which a first one of the first maximum points is located is closer to the leading edge than a starting point at which a first one of the second maximum points is located,
distances L1 between the minimum points and the first maximum points in the direction along the rotation axis vary in accordance with a position of each of the first maximum points such that the distance L1 increases from the starting point at which the first one the first maximum points is located, toward the trailing edge, and
distances L2 between the connection point and the second maximum points in the direction along the rotation axis vary in accordance with a position of each of the second maximum points such that the distance L2 increases from the starting point at which the first one of the second maximum points is located, toward the trailing edge, and
the second maximum points are located such that radii from a central point of the boss to the second maximum points vary in accordance with a position of each of the second maximum points, and the radius from the central point of the boss to the second maximum point increases from the starting point at which the first one of the second maximum points is located, toward the trailing edge of the blade.
2. The propeller fan of claim 1, wherein
the distance L1 between the minimum point and the first maximum point in the direction along the rotation axis is greater than the distance L2 between the connection point and the second maximum point in the direction along the rotation axis.
3. The propeller fan of claim 1, wherein
the first maximum points are each located outward of a point corresponding to 90% of an outside diameter of the propeller fan around the rotation axis.
4. The propeller fan of claim 1, wherein
in the cross section of the blade in the radial direction, a distance RL2 between the first maximum point and the second maximum point in the radial direction is greater than a distance RL1 between the first maximum point and the outer peripheral portion of the blade in the radial direction.
5. The propeller fan of claim 1, wherein
in the cross section of the blade in the radial direction, the minimum point is located inward of, in the radial direction, a middle position between a position of the first maximum point in the radial direction and a position of the second maximum point in the radial direction.
6. The propeller fan of claim 1, wherein
on a line extending in a rotation direction of the propeller fan and connecting endpoints of radii having the same length, the starting point at which the first one of the second maximum points is located is closer to the leading edge than a point which is located away from the leading edge by 50% of a distance between the leading edge of the blade and the trailing edge of the blade in the rotation direction.

7. The propeller fan of claim 1, wherein
in a cross section of the blade, which is projected in the rotation direction, a middle point bet the leading edge of the blade and the trailing edge of the blade at the outer peripheral portion of the blade is located downstream of, in an air flow, a middle point between the leading edge and the trailing edge at a connection portion between the blade and the boss.

8. An air-sending device comprising the propeller fan of claim 1.

9. The air-sending device of claim 8, further comprising:
a bell mouth surrounding the propeller fan from an outer side outward of the propeller fan in the radial direction: and
a mesh protective guard attached to an outlet portion of the bell mouth, the outlet portion allowing an air flow in the bell mouth to flow out of the bell mouth
wherein the protective guard is provided with meshes, and of the meshes, meshes located on a radially outer side of the air-sending device are smaller than meshes located on a radially inner side of the air-sending device.

10. An air-conditioning apparatus comprising the air-sending device of claim 8, wherein the air-sending device is provided in an outdoor unit.

11. The propeller fan according to claim 1, wherein
in each cross section of each of the plurality of blades in the radial direction thereof, each first maximum point projects further toward the downstream side of the air flow than an outer adjacent point and an inner adjacent point,
the outer adjacent point being a point adjacent to the first maximum point along the cross section and closer to the outer peripheral portion of the blade than the first maximum point, and
the inner adjacent point being a point adjacent to the first maximum point along the cross section and closer to the boss than the first maximum point.

* * * * *